United States Patent
Pfestorf et al.

(10) Patent No.: US 6,345,599 B1
(45) Date of Patent: Feb. 12, 2002

(54) PISTON FOR INTERNAL COMBUSTION ENGINES

(75) Inventors: Harald Pfestorf, Untereisesheim; Siegfried Mielke, Neckarsulm; Werner Landvatter, Untereisesheim; Emmerich Ottliczky, Forchtenberg-Ernsbach, all of (DE)

(73) Assignee: KS Kolbenschmidt GmbH, Neckarsulm (DE)

( * ) Notice: Subject to any disclaimer, the term of this patent is extended or adjusted under 35 U.S.C. 154(b) by 0 days.

(21) Appl. No.: 09/744,986

(22) PCT Filed: Jul. 29, 1999

(86) PCT No.: PCT/EP99/05422

§ 371 Date: Feb. 16, 2001

§ 102(e) Date: Feb. 16, 2001

(87) PCT Pub. No.: WO00/11377

PCT Pub. Date: Mar. 2, 2000

(30) Foreign Application Priority Data

Aug. 19, 1998 (DE) .......................... 198 37 596

(51) Int. Cl.⁷ ................. F16J 1/16; F02F 3/00
(52) U.S. Cl. ................. 123/193.6; 123/193.4; 92/187; 29/888.05
(58) Field of Search ............ 123/193.6, 193.4; 92/187; 29/888.05, 888.051, 888.01

(56) References Cited

U.S. PATENT DOCUMENTS

| 1,623,972 | A |   | 4/1927  | Pierce |
|-----------|---|---|---------|--------|
| 2,027,035 | A |   | 1/1936  | Gehres |
| 4,189,932 | A | * | 2/1980  | Fielder ............ 29/888.05 |
| 4,241,960 | A |   | 12/1980 | Hentschel |
| 4,633,764 | A | * | 1/1987  | Kohnert ............ 92/208 |
| 4,930,910 | A |   | 6/1990  | Mori et al. |
| 5,063,831 | A |   | 11/1991 | Byard |
| 5,549,034 | A | * | 8/1996  | Loughlin ............ 92/187 |
| 5,661,904 | A | * | 9/1997  | Loughlin ............ 29/888.01 |

FOREIGN PATENT DOCUMENTS

| DE | 3932563 A1 | 4/1991 |
| DE | 4019055 C1 | 11/1991 |
| FR | 2608631    | 11/1987 |

* cited by examiner

Primary Examiner—Marquerite McMahon
(74) Attorney, Agent, or Firm—Jones, Tullar & Cooper, P.C.

(57) ABSTRACT

A light metal piston for internal combustion engines which includes a bearing bushing comprising a shell wrapped from a rolled strip or band shaped metal material. The shell has a butt joint which is closed in a pressed-in state, with a preferred orientation of the metallurgical grain areas being formed in the circumferential direction of the shell.

9 Claims, 1 Drawing Sheet

PISTON FOR INTERNAL COMBUSTION ENGINES

FIELD OF THE INVENTION

The present invention relates to a piston made of a light metal for internal combustion engines, having bearing bushings for the piston pin inserted into piston pin bores, by means of which the piston is in driven connection with the connecting rod of the engine.

PRIOR ART

The bearing shells of known light metal pistons, such as described in German Patent DE 39 32 563 A1, are sections turned on a lathe, which were cut off a pressed pipe. At times, a permanent fixed seating of the bearing bushings in the piston pin bore has been shown to be problematic.

SUMMARY OF THE INVENTION

Based on the foregoing, the present invention is based on the object of improving the secure seating of bearing bushings in the piston pin bore.

In accordance with the present invention, this is achieved in connection with a light metal piston of the type described at the outset in that the bearing bushings is a shell wrapped from a rolled strip-or band-shaped metal material, which has a butt-joint at the joint which is closed in the pressed-in state, and in that an orientation in the first drawing direction of the metallurgical grain areas is formed in the circumferential direction.

By means of the present invention it was noted that loosening effects no longer appear in the bearing bushings when employing a wrapped bearing bushings of the type described above. With wrapped bushings with an orientation in the first drawing direction of the metallurgical grain areas in the circumferential direction, the permanency of the secure seating is considerably increased. The orientation in the first drawing direction of the metallurgical grain areas is achieved in accordance with the present invention in that during the production of the bearing bushings the strip-or band shaped metal material is oriented in such a way that the circumferential direction of the bearing bushings to be produced coincides with the milling direction of the alloy material.

It has furthermore been shown to be particularly advantageous if the bushings is oriented in the piston pin bore in such a way that, viewed in the linear direction of the piston pin the gap at the joint is arranged in the half of the piston pin bore facing the shaft end of the piston, preferably in the segment between 130 and 180 degrees, in particular between 130 and 150 degrees. Moreover, it has been shown to be advantageous if the butt-joint at the joint is located on the counter-pressure side (GDS) of the piston.

Shown in the drawings are in:

DETAILED DESCRIPTION

Figure 1:
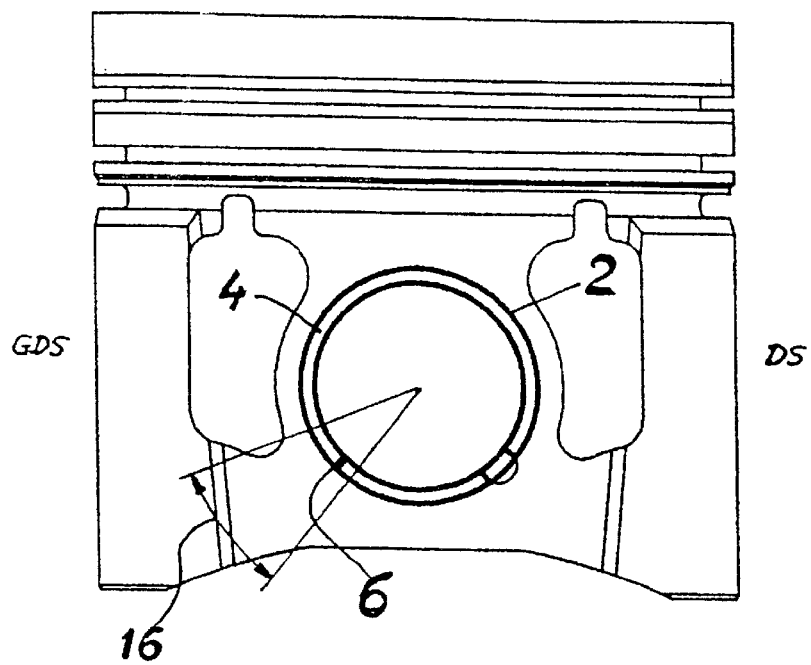
FIG. 1, is a lateral view of a light alloy piston in accordance with the preset invention with a shrink-fit wrapped bearing bushings.
Figure 2:
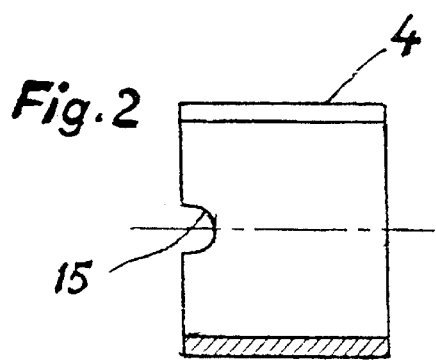
FIGS. 2 to 4, show different plan views of the bearing bushings in accordance with FIG. 1.
Figure 3:
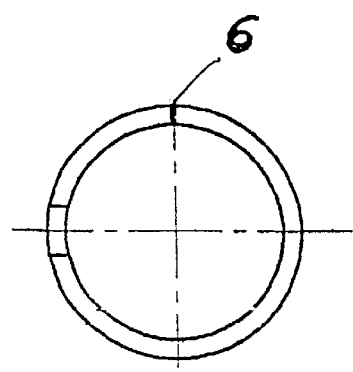
Figure 4:
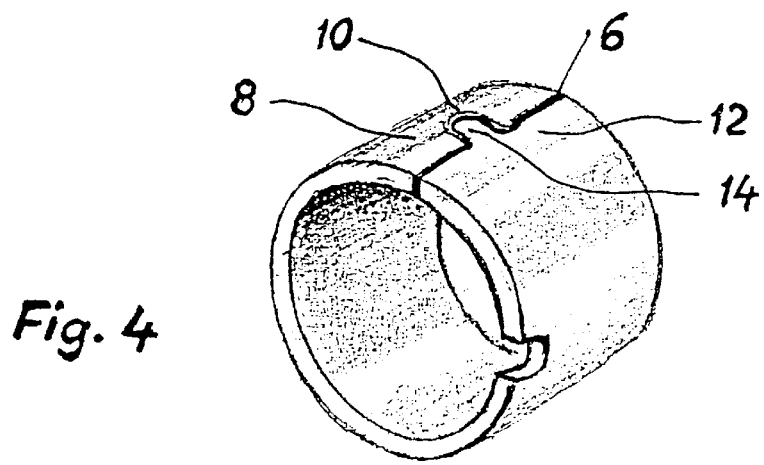

FIG. 1 represents a light metal piston made of an aluminum-silicon alloy with 7 to 25 wt.-% of silicon. A bearing bushing 4 is inserted into each of the piston pin bores 2. The bearing bushing was greatly supercooled by means of liquid nitrogen and then inserted into the piston pin bore 2.

The bearing bushing 4 is a wrapped shell with a butt-joint 6 at the joint. The shell is produced from a rolled strip-or band-shaped bearing material in the form of a CuZn31Si alloy, wherein the metal material is oriented in such a way that the rolling direction matches the circumferential direction of the bearing bushing 4. The wrapped shell of the bushing 4 has a cutout 10 at a joint section 8, and on the other joint section 12 has a tongue 14, which is embodied complementary to the cutout 10. In the shrunk-fit state, the butt-joint 6 at the joint is closed. A cutout is identified by the reference numeral 15, through which a snap ring can be subsequently lifted out, which is seated in a groove which must still be lathed out, for axially securing the piston pin.

As can be seen from FIG. 1, the shell is oriented in the piston pin bore 2 in such a way that, viewed in the linear direction of the piston pin, its butt-joint at the joint is arranged on the counter-pressure side GDS in the segment 16 between 130 and 150 degrees in relation to the linear direction of the piston.

What is claimed is:

1. A light metal piston for internal combustion engines, including piston pin bores which receive a bearing bushing for a piston pin for connecting the piston to the connecting rod of the engine, said bearing bushing comprising a shell wrapped from a rolled strip or band shaped metal material, said shell having a butt joint which is closed in a pressed-in state, wherein a preferred orientation of the metallurgical grain areas is formed in the circumferential direction of said shell.

2. The light metal piston as defined in claim 1, wherein said bearing bushing is oriented in the piston pin bore, when viewed in the longitudinal direction of the piston pin, such that said butt joint is arranged in that half of the piston pin bore facing the shaft end of the piston.

3. The light metal piston as defined in claim 2, wherein said butt joint is arranged in the segment between 130° and 180° with respect to the longitudinal direction of the piston when viewed in the longitudinal direction of the piston pin.

4. The light metal piston as defined in claim 2, wherein said butt joint is arranged in the segment between 130° and 150° with respect to the longitudinal direction of the piston when viewed in the longitudinal direction of the piston pin.

5. The light metal piston as defined in claim 1, wherein the wall thickness of said wrapped shell is 4 to 8% of the inner diameter of the piston pin bore.

6. The light metal piston as defined in claim 1, wherein said wrapped shell has a cutout at one side of the butt joint and a tongue on the other side of the butt joint which is complementary to said cutout and which meshes therewith.

7. The light metal piston as defined in claim 1, wherein said wrapped shell is fitted into the piston pin bore by shrink-fitting at a low temperature.

8. The light metal piston as defined in claim 1, wherein said wrapped shell is made of a copper-zinc alloy.

9. The light metal piston as defined in claim 8, wherein the copper-zinc alloy is a CuZn31Si-alloy.

* * * * *